United States Patent
Yang et al.

(10) Patent No.: US 11,163,397 B2
(45) Date of Patent: Nov. 2, 2021

(54) INPUT SENSING PANEL AND DISPLAY DEVICE HAVING THE SAME

(71) Applicant: Samsung Display Co., Ltd., Yongin-si (KR)

(72) Inventors: Sung-Jin Yang, Cheonan-si (KR); Hyunsik Park, Cheonan-si (KR); Chungi You, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/936,268

(22) Filed: Jul. 22, 2020

(65) Prior Publication Data

US 2021/0064211 A1 Mar. 4, 2021

(30) Foreign Application Priority Data

Sep. 4, 2019 (KR) .................. 10-2019-0109658

(51) Int. Cl.
*G06F 3/041* (2006.01)
*G06F 3/044* (2006.01)

(52) U.S. Cl.
CPC ........ *G06F 3/04164* (2019.05); *G06F 3/0445* (2019.05); *G06F 3/0446* (2019.05); *G06F 2203/04111* (2013.01)

(58) Field of Classification Search
CPC .. G06F 3/04164; G06F 3/0445; G06F 3/0446; G06F 2203/04111
USPC ....................................................... 345/173
See application file for complete search history.

(56) References Cited

U.S. PATENT DOCUMENTS

| | | | |
|---|---|---|---|
| 9,831,432 B2 | 11/2017 | Im | |
| 2011/0057893 A1 | 3/2011 | Kim et al. | |
| 2011/0157084 A1* | 6/2011 | Huang | G06F 3/0446 345/174 |
| 2017/0098769 A1* | 4/2017 | Im | H01L 51/0031 |
| 2018/0063962 A1 | 3/2018 | Lee et al. | |
| 2018/0192503 A1* | 7/2018 | Fang | H05K 9/0064 |
| 2018/0321762 A1* | 11/2018 | Lee | G06F 3/0418 |
| 2019/0326361 A1* | 10/2019 | Gwon | G06F 3/04164 |

FOREIGN PATENT DOCUMENTS

| | | |
|---|---|---|
| KR | 10-1082293 B1 | 11/2011 |
| KR | 10-2014-0075920 A | 6/2014 |
| KR | 10-2017-0039813 A | 4/2017 |
| KR | 10-1818258 B1 | 1/2018 |
| KR | 10-2018-0025350 A | 3/2018 |

* cited by examiner

*Primary Examiner* — Mark Edwards
(74) *Attorney, Agent, or Firm* — Lewis Roca Rothgerber Christie LLP

(57) ABSTRACT

A display device includes: a display panel including a plurality of pixels, and display pads connected to the pixels; and an input sensing panel on the display panel, and including: an input sensing layer including: a sensing electrode to sense an input; a sensing line connected to the sensing electrode; and sensing pads connected to the sensing line; an electrostatic sensing circuit spaced from the sensing pads; and a floating pattern circuit electrically insulated from the input sensing layer, and including a bridge pattern. The bridge pattern is connected to the electrostatic sensing circuit.

20 Claims, 12 Drawing Sheets

INPUT SENSING PANEL AND DISPLAY DEVICE HAVING THE SAME

CROSS-REFERENCE TO RELATED APPLICATION

This application claims priority to and the benefit of Korean Patent Application No. 10-2019-0109658, filed on Sep. 4, 2019, the entire content of which is incorporated by reference herein.

BACKGROUND

1. Field

Aspects of example embodiments of the present disclosure relate to an input sensing panel having improved durability, and a display device including the same.

2. Description of the Related Art

A display device may include a display panel that displays an image and an input sensing panel that senses an external input. The input sensing panel may include sensing electrodes, sensing lines, and sensing pads. The sensing lines may transmit and/or receive a signal.

The above information disclosed in this Background section is for enhancement of understanding of the background of the present disclosure, and therefore, it may contain information that does not constitute prior art.

SUMMARY

One or more example embodiments of the present disclosure are directed to an input sensing panel having improved durability, and a display device including the same.

According to one or more example embodiments of the present disclosure, a display device includes: a display panel including a plurality of pixels, and display pads connected to the pixels; and an input sensing panel on the display panel, and including: an input sensing layer including: a sensing electrode configured to sense an input; a sensing line connected to the sensing electrode; and sensing pads connected to the sensing line; an electrostatic sensing circuit spaced from the sensing pads; and a floating pattern circuit electrically insulated from the input sensing layer, and including a bridge pattern. The bridge pattern is connected to the electrostatic sensing circuit.

In an embodiment, the floating pattern circuit may include a resistance test pattern, and an alignment pattern connected to the resistance test pattern.

In an embodiment, the electrostatic sensing circuit may include: a first electrostatic sensing pad, and a second electrostatic sensing pad spaced from the first electrostatic sensing pad with the sensing pads therebetween; a first electrostatic sensing line surrounding a portion of the sensing electrode, and including one end connected to the first electrostatic sensing pad; and a second electrostatic sensing line surrounding another portion of the sensing electrode, and including one end connected to the second electrostatic sensing pad. Other ends of the first electrostatic sensing line and the second electrostatic sensing line may be spaced from each other.

In an embodiment, the bridge pattern may connect one of the first electrostatic sensing pad and the second electrostatic sensing pad to the resistance test pattern.

In an embodiment, the bridge pattern may connect one of the first electrostatic sensing line and the second electrostatic sensing line to the alignment pattern.

In an embodiment, the input sensing panel may further include a dummy pattern between the electrostatic sensing circuit and the floating pattern circuit.

In an embodiment, the dummy pattern may have one from among a polygonal shape, an oval shape, and a circular shape.

In an embodiment, the input sensing panel may include: a first conductive layer on the display panel; a first insulation layer covering the first conductive layer; and a second conductive layer on the first insulation layer.

In an embodiment, the first conductive layer may include a metal, the second conductive layer may include a transparent conductive material, and the bridge pattern may be defined as a portion of the first conductive layer.

In an embodiment, the second conductive layer may include a metal, the first conductive layer may include a transparent conductive material, and the bridge pattern may be defined as a portion of the second conductive layer.

In an embodiment, the display device may further include: an active area defined in a first direction and a second direction crossing the first direction, the active area being configured to provide light generated from the display panel; and a peripheral area surrounding the active area. The display pads may be arranged along the first direction at one side of the peripheral area, and the sensing pads and the floating pattern circuit may be arranged along the first direction at another side of the peripheral area to be spaced from the display pads in the second direction with the active area therebetween.

In an embodiment, the display device may further include a coupling member, and the display panel and the input sensing panel may be bonded to each other through the coupling member.

In an embodiment, the input sensing panel may be directly disposed on the display panel.

According to one or more example embodiments of the present disclosure, a display device includes: a base layer; an input sensing layer on the base layer, and including: a sensing electrode configured to sense an input; a sensing line connected to the sensing electrode; and sensing pads connected to the sensing line; an electrostatic sensing circuit spaced from the sensing pads; and a floating pattern circuit electrically insulated from the input sensing layer, and including a bridge pattern. The bridge pattern is connected to the electrostatic sensing circuit.

In an embodiment, the floating pattern circuit may include a resistance test pattern, and an alignment pattern connected to the resistance test pattern.

In an embodiment, the electrostatic sensing circuit may include: a first electrostatic sensing pad, and a second electrostatic sensing pad spaced from the first electrostatic sensing pad with the sensing pads therebetween; a first electrostatic sensing line surrounding a portion of the sensing electrode, and including one end connected to the first electrostatic sensing pad; and a second electrostatic sensing line surrounding another portion of the sensing electrode, and including one end connected to the second electrostatic sensing pad. Other ends of the first electrostatic sensing line and the second electrostatic sensing line may be spaced from each other.

In an embodiment, the bridge pattern may connect one of the first electrostatic sensing pad and the second electrostatic sensing pad to the resistance test pattern.

In an embodiment, the bridge pattern may connect one of the first electrostatic sensing line and the second electrostatic sensing line to the alignment pattern.

In an embodiment, the input sensing layer may further include a dummy pattern between the electrostatic sensing circuit and the floating pattern circuit.

In an embodiment, each of the bridge pattern and the dummy pattern may include a metal.

BRIEF DESCRIPTION OF THE DRAWINGS

The above and other aspects and features of the present disclosure will become more apparent to those skilled in the art from the following detailed description of the example embodiments with reference to the accompanying drawings, in which.

DETAILED DESCRIPTION

Figure 1:
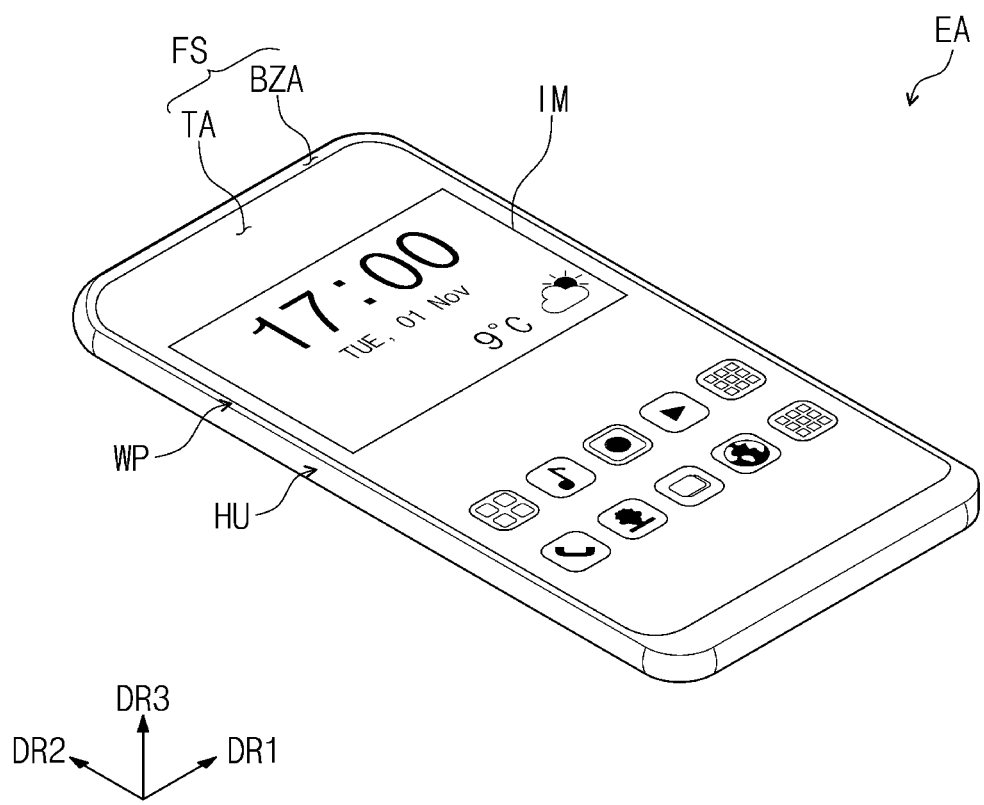
FIG. 1 is a perspective view of a display device according to an embodiment of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
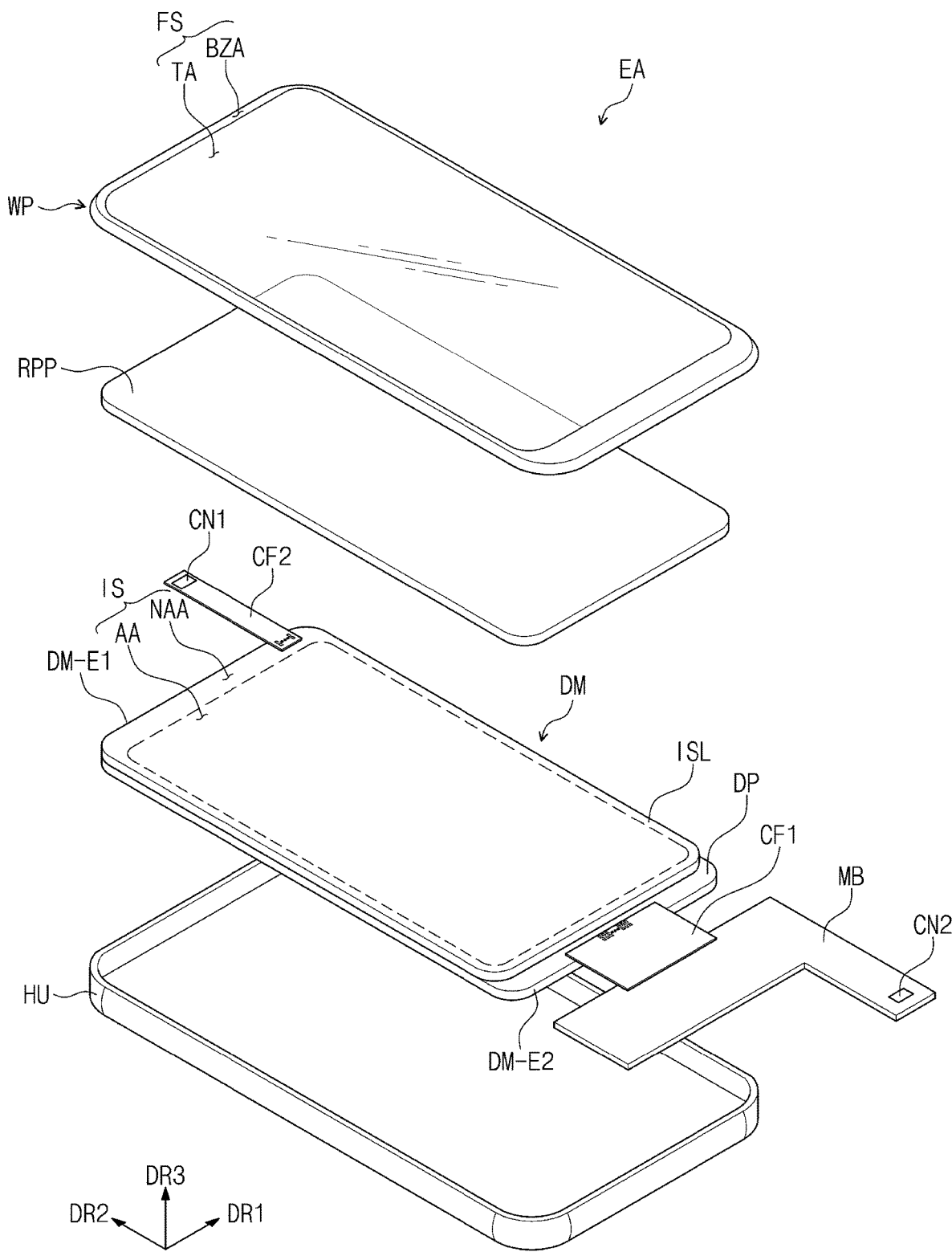
FIG. 2 is an exploded perspective view of the display device according to an embodiment of the present disclosure.

FIG. 1 is a perspective view of a display device according to an embodiment of the present disclosure. FIG. 2 is an exploded perspective view of the display device according to an embodiment of the present disclosure.

Referring to FIGS. 1 and 2, a display device EA may be a device that is activated according to an electrical signal. The display device EA may be realized through (or used in) various kinds of electronic devices. For example, the display device EA may be used for large electronic devices, such as a television, a monitor, an external billboard, and/or the like, as well as small and/or mid-sized electronic devices, such as a smart phone, a tablet, a personal computer, a notebook computer, a personal digital terminal, a car navigation unit (e.g., a car navigation device), a game console, a portable electronic device, a camera, and/or the like. However, the present disclosure is not limited thereto, and the above-described electronic devices are provided merely as various examples, and thus, the display device EA may be adopted for other suitable electronic equipment and/or devices without departing from the spirit and scope of the present disclosure. Hereinafter, the display device EA will be described as being included in a smart phone as an illustrative example.

The display device EA may display an image IM in (e.g., towards) the third direction DR3 on a display surface FS that is parallel to or substantially parallel to each of the first and second directions DR1 and DR2. The image IM may include a still image and/or a dynamic image (e.g., a moving image). In FIG. 1, the image IM is shown to include a clock and various icons as an illustrative example. The display surface FS on which the image IM is displayed may correspond to a front surface of the display device EA, and may also correspond to a front surface of a window panel WP.

As used herein, a front surface (e.g., a top surface) or a rear surface (e.g., a bottom surface) of each member may be defined according to (e.g., based on) a direction in (e.g., a direction towards) which the image IM is displayed. For example, the front and rear surfaces may face away from each other (e.g., may be opposite surfaces) in the third direction DR3. A normal direction of each of the front and rear surfaces may be parallel to or substantially parallel to the third direction DR3. The directions indicated as the first to third directions DR1, DR2, and DR3 may be relative, and thus, may be variously modified into different suitable directions. Hereinafter, the first to third directions may be directions indicated by the first to third directions DR1, DR2, and DR3 shown in the figures, and may be designated by the same reference symbols, respectively. As used herein, the terms "on the plane" and "in a plan view" may refer to a view from the third direction DR3 (e.g., a view from a plane in the third direction DR3).

The display device EA may include the window panel WP, an antireflection panel RPP, a display module (e.g., a display or a display assembly) DM, and a housing HU. In the present embodiment, the window panel WP and the housing HU may be coupled to each other to define an outer appearance of the display device EA.

The window panel WP may include an optically transparent insulation material. For example, the window panel WP may include glass and/or plastic. The window panel WP may have a single-layer structure or a multilayered structure. For example, the window panel WP may include a plurality of plastic films bonded to each other by using an adhesive, or may include a glass substrate and a plastic film, which may be bonded to each other by using an adhesive.

The front surface FS of the window panel WP may define the front surface of the display device EA as described above. The front surface FS may include a transmission area TA, and a bezel area BZA. The transmission area TA may be an optically transparent area. For example, the transmission area TA may be an area having a visible light transmittance of about 90% or greater.

The bezel area BZA may be an area having light transmittance that is relatively less than that of the transmission area TA. The bezel area BZA may define a shape of the transmission area TA. For example, the bezel area BZA may be disposed to be adjacent to the transmission area TA, and may at least partially surround (e.g., around a periphery of) the transmission area TA.

The bezel area BZA may have a suitable or desired color (e.g., a predetermined color). The bezel area BZA may cover a peripheral area NAA of the display module DM to prevent or substantially prevent the peripheral area NAA from being visible from the outside. However, the present disclosure is not limited thereto. For example, in the window panel WP according to an embodiment of the present disclosure, the bezel area BZA may be omitted.

The antireflection panel RPP may be disposed below (e.g., under or underneath) the window panel WP. The antireflection panel RPP may reduce reflectance of external light incident thereon from an upper side of the window panel WP. However, the present disclosure is not limited thereto. For example, in an embodiment of the present disclosure, the antireflection panel RPP may be omitted, or may be provided as a component included in the display module DM.

The display module DM may display the image IM, and may sense an external input. The display module DM includes a front surface IS including an active area AA and a peripheral area NAA. The active area AA may be an area that is activated according to an electrical signal. The peripheral area NAA may at least partially surround (e.g., around a periphery of) the active area AA. However, the present disclosure is not limited thereto. For example, in various embodiments, the peripheral area NAA may be omitted, the peripheral area NAA in one direction may be omitted, or the peripheral area NAA may be adjacent to only two or less sides of the active area AA.

In the embodiment shown in FIG. 2, the active area AA may be an area at (e.g., in or on) which the image IM is displayed, and may also be an area at (e.g., in or on) which the external input is sensed. The transmission area TA may overlap with at least the active area AA. For example, the transmission area TA may overlap with an entire surface of at least a portion of the active area AA. Thus, a user may view the image IM and/or may provide an external input through the transmission area TA. However, the present disclosure is not limited thereto. For example, an area of the active area AA at (e.g., in or on) which the image IM is displayed, and an area of the active area AA at (e.g., in or on)

which the external input is sensed may be separate from each other, but is not limited to a specific embodiment.

The peripheral area NAA may be an area covered by the bezel area BZA. The peripheral area NAA may be adjacent to the active area AA. The peripheral area NAA may at least partially surround (e.g., around a periphery of) the active area AA. A driving circuit and/or a driving line for driving the active area AA may be disposed on the peripheral area NAA.

The display module DM may include a display panel DP and an input sensing panel ISL. Further, the display module DM may include driving circuits CF1, CF2, and MB that are electrically connected to the display panel DP and the input sensing panel ISL.

The display panel DP may include (e.g., may be) a constituent (e.g., a component) that generates or substantially generates the image IM. The image IM generated by the display panel DP may be visible from the outside by the user through the transmission area TA.

The input sensing panel ISL may sense an external input applied from the outside. As described above, the input sensing panel ISL may sense the external input provided to the window panel WP.

The driving circuits CF1, CF2, and MB may be electrically connected to the display panel DP and the input sensing panel ISL. The driving circuits CF1, CF2, and MB may include a main circuit board MB, a first circuit board CF1, and a second circuit board CF2.

The first circuit board CF1 may be electrically connected to the display panel DP. The first circuit board CF1 may connect the display panel DP to the main circuit board MB. In this embodiment, the first circuit board CF1 may be provided as a flexible circuit film. However, the present disclosure is not limited thereto. For example, in other embodiments, the first circuit board CF1 may not be connected to the main circuit board MB, and/or the first circuit board CF1 may be a rigid circuit board.

The first circuit board CF1 may be connected to pads (e.g., display pads) of the display panel DP disposed at (e.g., in or on) the peripheral area NAA. The first circuit board CF1 provides an electrical signal to the display panel DP for driving the display panel DP. The electrical signal may be generated in the first circuit board CF1, or may be generated in the main circuit board MB.

The second circuit board CB2 may be electrically connected to the input sensing panel ISL. The second circuit board CF2 may connect the input sensing panel ISL to the main circuit board MB. In this embodiment, the second circuit board CF2 may be provided as a flexible circuit film. However, the present disclosure is not limited thereto. For example, the second circuit board CF2 may not be connected to the main circuit board MB, and/or the second circuit board CF2 may be a rigid circuit board.

The second circuit board CF2 may be connected to pads (e.g., sensing pads) of the input sensing panel ISL disposed at (e.g., in or on) the peripheral area NAA. The second circuit board CF2 provides an electrical signal to the input sensing panel ISL for driving the input sensing panel ISL. The electrical signal may be generated in the second circuit board CF2, or may be generated in the main circuit board MB.

The main circuit board MB may include various driving circuits for driving the display module DM, and a connector for supplying power. Each of the first circuit board CF1 and the second circuit board CF2 may be connected to the main circuit board MCB. According to an embodiment of the present disclosure, the display module DM may be controlled (e.g., may be easily controlled) through one main circuit board MB. However, the present disclosure is not limited thereto. For example, in the display module according to an embodiment of the present disclosure, the display panel DP and the input sensing panel ISL may be connected to different main boards, respectively, or one of the first circuit board CF1 and the second circuit board CF2 may not be connected to one main circuit board MB, but is not limited to a specific embodiment.

The first circuit board CF1 and the second circuit board CF2 may be bent in a direction towards a rear surface of the display panel DP. In this case, a first contact part CN1 of the second circuit board CF2 may be connected to a second contact part CN2 of the main circuit board MB in a state where the first and second circuit boards CF1 and CF2 are bent.

In this embodiment, the first circuit board CF1 and the second circuit board CF2 may be disposed at (e.g., in or on) different sides of the display module DM from each other. For example, the first circuit board CF1 and the second circuit board CF2 may be spaced apart from each other in the second direction DR2 with the active area AA therebetween. Therefore, the second circuit board CF2 may be disposed at one side of the display module DM adjacent to a first edge DM-E1 of the display module DM, and the first circuit board CF1 may be disposed at another side of the display module DM adjacent to a second edge DM-E2 of the display module DM. In an embodiment, the first edge DM-E1 may be spaced apart from the second edge DM-E2 in the second direction DR2. However, the present disclosure is not limited thereto. For example, in another embodiment, the first circuit board CF1 and the second circuit board CF2 may be disposed at the same side of the display module DM as each other.

According to this embodiment, because the first circuit board CF1 and the second circuit board CF2 may be disposed at different sides of the display module DM from each other, the peripheral area NAA (e.g., unnecessary portions of the peripheral area NAA) may be reduced. Accordingly, the display module DM including a reduced bezel (e.g., a narrow bezel) may be provided.

The housing HU may be coupled to the window panel WP. The housing HU may be coupled to the window panel WP to provide a suitable or desired internal space (e.g., a predetermined internal space). The display module DM may be accommodated in the internal space.

The housing HU may include a material having relatively high rigidity. For example, the housing HU may include glass, plastic, and/or a metal, or may include a plurality of frames and/or plates made of a combination of glass, plastic, and/or a metal. The housing HU may protect or substantially protect (e.g., may stably protect) the constituents (e.g., the components) of the display device EA, which may be accommodated in the internal space, against an external impact.

Figure 3A:
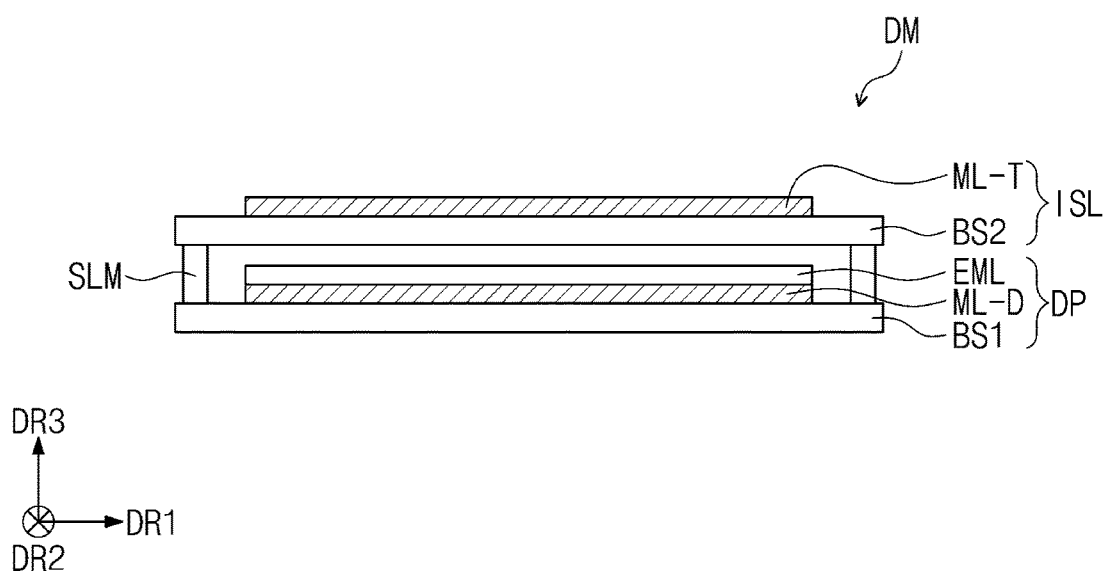
FIG. 3A is a cross-sectional view of the display device according to an embodiment of the present disclosure.
Figure 3B:
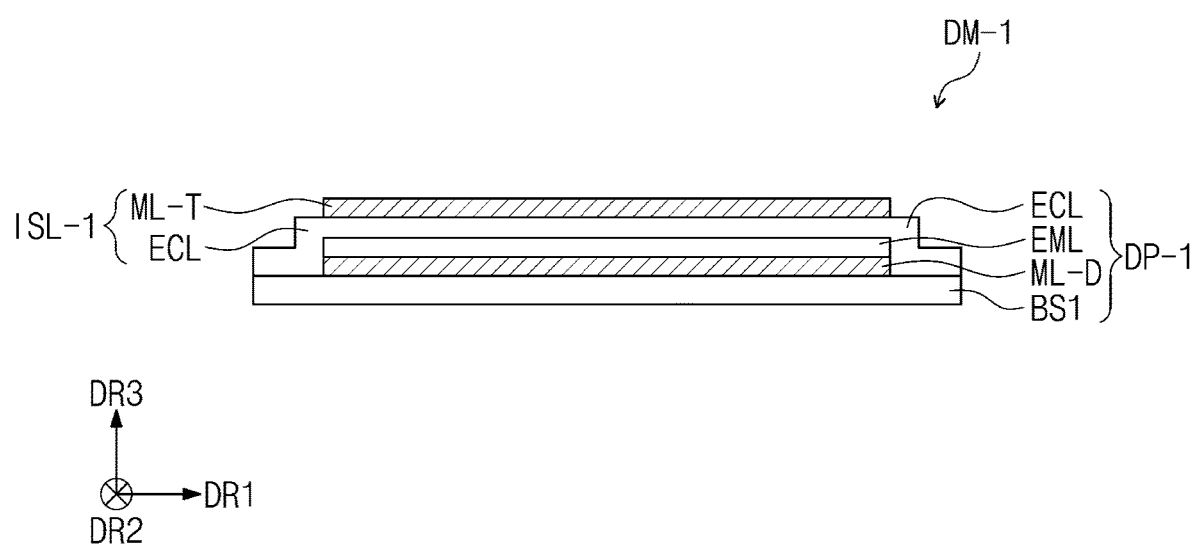
FIG. 3B is a cross-sectional view of the display device according to an embodiment of the present disclosure.

FIG. 3A is a cross-sectional view of the display device according to an embodiment of the present disclosure. FIG. 3B is a cross-sectional view of the display device according to an embodiment of the present disclosure.

Referring to FIG. 3A, a display module (e.g., a display or a display assembly) DM may include a display panel DP, an input sensing panel ISL, and a coupling member SLM.

The display panel DP according to an embodiment of the present disclosure may be an emission type display panel, but the present disclosure is not limited thereto. For example, the display panel DP may be an organic light emitting display panel, a quantum dot light emitting display panel, a liquid crystal display panel, and/or the like.

The display panel DP may include a first substrate BS1, a display circuit layer ML-D, and a display element layer EML. The input sensing panel ISL may include a second substrate BS2 and a sensing circuit layer ML-T.

Each of the first substrate BS1 and the second substrate BS2 may be a silicon substrate, a plastic substrate, an insulation film, or a laminated structure including a plurality of insulation layers.

The display circuit layer ML-D may be disposed on the first substrate BS1. The display circuit layer ML-D may include a plurality of insulation layers, a plurality of conductive layers, and a semiconductor layer. The plurality of conductive layers of the display circuit layer ML-D may define (e.g., may constitute) signal lines and/or a control circuit of a pixel.

The display element layer EML may be disposed on the display circuit layer ML-D. The display element layer EML may be a layer that generates light and/or that controls a light transmittance. For example, the display element layer EML of the organic light emitting display panel may include an organic light emitting material. The display element layer EML of the quantum dot light emitting display panel may include at least one of a quantum dot, a quantum rod, and/or the like. The display element layer EML of the liquid crystal display panel may include a liquid crystal layer.

The second substrate BS2 may be disposed on the display element layer EML. A space (e.g., a predetermined space) may be defined between the second substrate BS2 and the display element layer EML. The space may be filled with air and/or an inert gas. In an embodiment of the present disclosure, the space may be a filler, for example, such as a silicone-based polymer, an epoxy-based resin, or an acrylic-based resin.

The sensing circuit layer ML-T may be disposed on the second substrate BS2. The sensing circuit layer ML-T may include a plurality of insulation layers and a plurality of conductive layers. The plurality of conductive layers may define (e.g., may constitute) a sensing electrode that senses the external input, a sensing line connected to the sensing electrode, and/or a sensing pad connected to the sensing line.

The coupling member SLM may be disposed between the first substrate BS1 and the second substrate BS2. The coupling member SLM may couple the first substrate BS1 to the second substrate BS2. The coupling member SLM may include an organic material, for example, such as a photo-curable resin or a photoplastic resin, or may include an inorganic material, for example, such as a frit seal, but the present disclosure is not limited thereto.

Referring to FIG. 3B, a display module (e.g., a display or a display assembly) DM-1 may include a display panel DP-1 and an input sensing unit (e.g., an input sensing layer) ISL-1. The input sensing unit ISL-1 may be referred to as an input sensing layer.

The display panel DP may include the first substrate BS1, the display circuit layer ML-D, the display element layer EML, and a thin film encapsulation layer ECL. The input sensing unit ISL-1 may include a base layer ECL and a sensing circuit layer ML-T. The thin film encapsulation layer ECL and the base layer ECL may be the same layer.

According to an embodiment of the present disclosure, the display panel DP-1 and the input sensing unit ISL-1 may be formed through a continuous process. In other words, the sensing circuit layer ML-T may be directly disposed on the thin film encapsulation layer ECL.

Figure 4A:
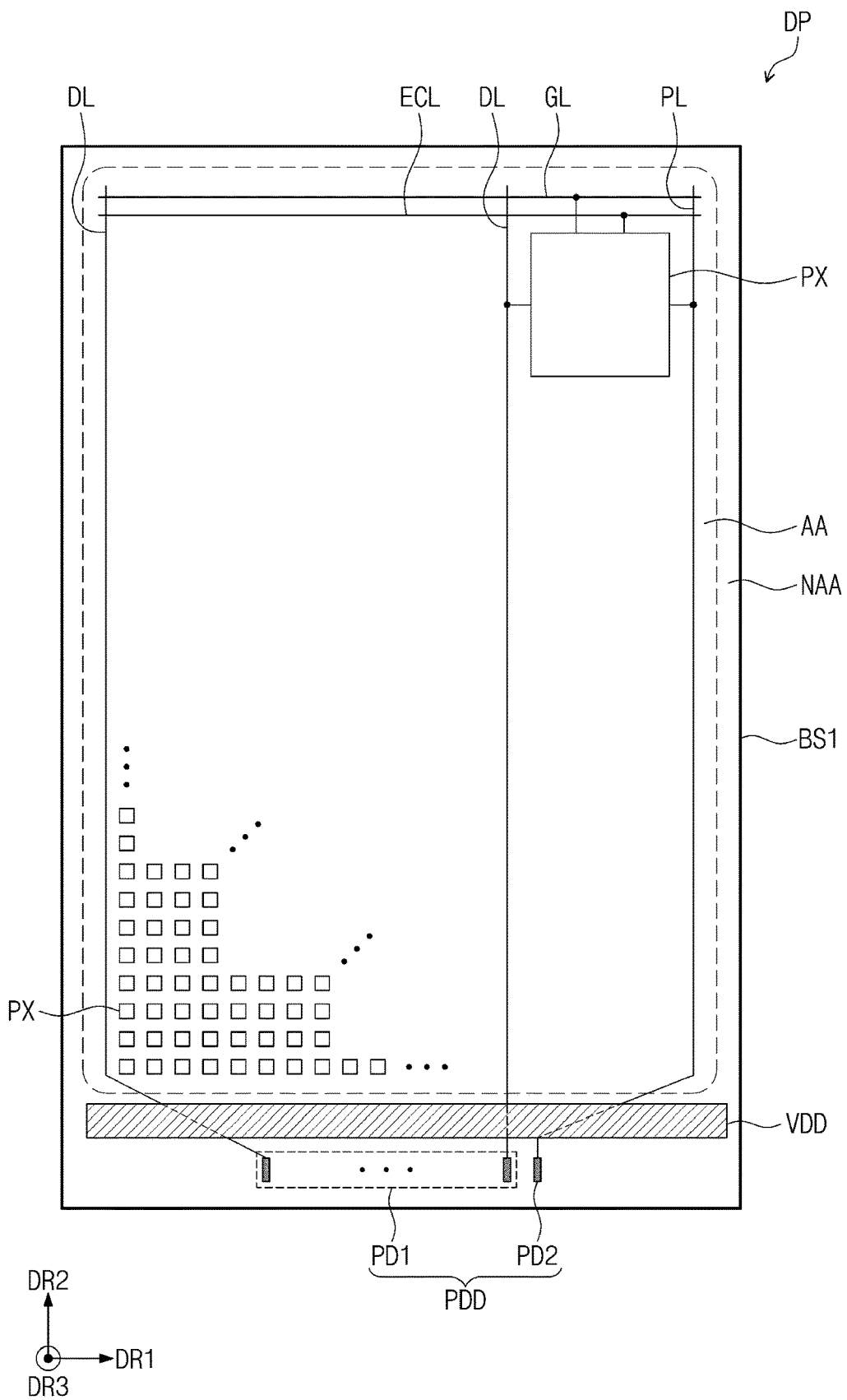
FIG. 4A is a plan view of a display panel according to an embodiment of the present disclosure.
Figure 4B:
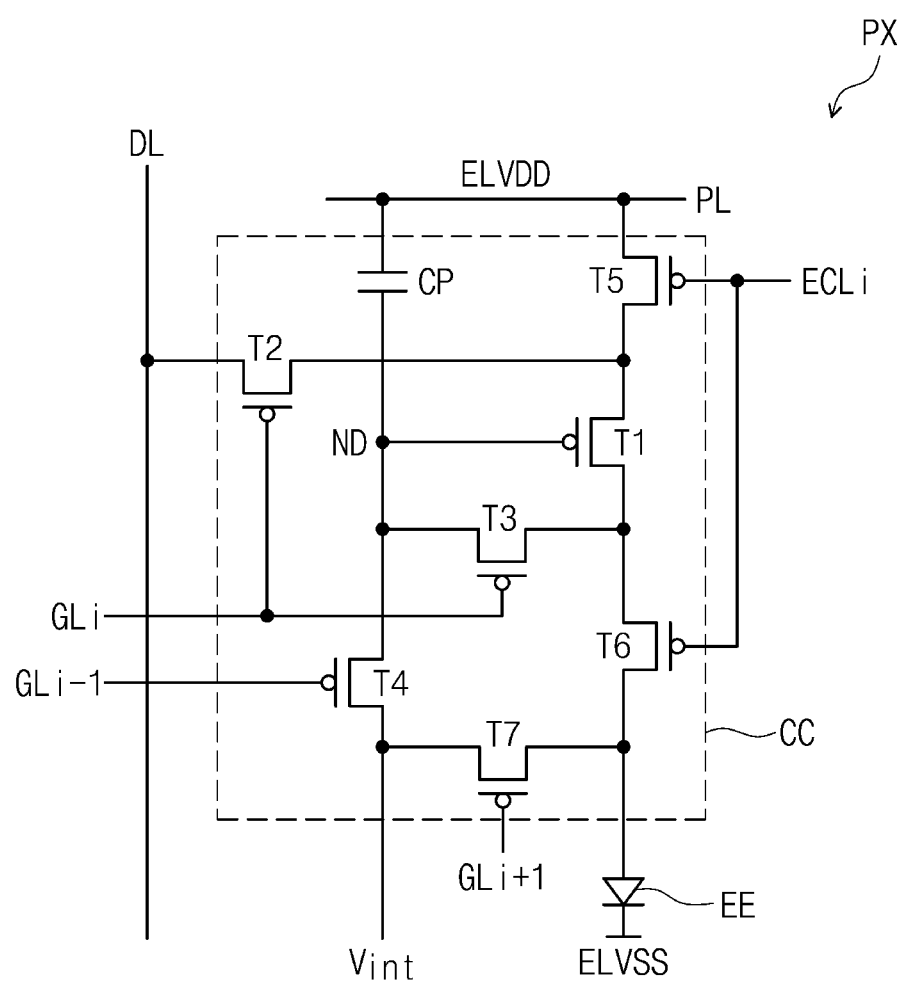
FIG. 4B is an equivalent circuit diagram of a pixel according to an embodiment of the present disclosure.

FIG. 4A is a plan view of the display panel according to an embodiment of the present disclosure. FIG. 4B is an equivalent circuit diagram of a pixel according to an embodiment of the present disclosure.

Referring to FIG. 4A, the display panel DP may include a plurality of pixels PX, a plurality of signal lines GL, DL, PL, and ECL, and a plurality of display pads PDD.

The active area AA of the display panel DP may be an area at (e.g., in or on) which an image is displayed, and the peripheral area NAA may be an area at (e.g., in or on) which the driving circuit and/or the driving line are disposed. In FIG. 4A, the active area AA and the peripheral area NAA of the display panel DP are shown. The plurality of pixels PX may be disposed at (e.g., in or on) the active area AA.

The plurality of signal lines GL, DL, PL, and ECL may be connected to the pixels PX to transmit electrical signals to the pixels PX. A scan line GL, a data line DL, a power line PL, and an emission control line ECL from among the signal lines provided in the display panel DP are illustrated in FIG. 4A as an example. However, the present disclosure is not limited thereto. For example, the signal lines GL, DL, PL, and ECL may further include an initialization voltage line, but the present disclosure is not limited thereto.

Referring to FIG. 4B, a signal circuit diagram of one pixel PX from among the plurality of pixels is illustrated as a representative example. FIG. 4B illustrates an example of the pixel PX connected to an i-th scan line GLi and an i-th emission control line ECLi (where i is a natural number).

The pixel PX may include a light emitting element EE and a pixel circuit CC. The pixel circuit CC may include a plurality of transistors T1 to T7, and a capacitor CP. The plurality of transistors T1 to T7 may be formed through a low temperature polycrystalline silicon (LTPS) process or a low temperature polycrystalline oxide (LTPO) process.

The pixel circuit CC may control an amount of current flowing in the light emitting element EE in response to a data signal. The light emitting element EE may emit light having a desired luminance (e.g., a predetermined luminance) corresponding to the amount of current supplied from the pixel circuit CC. In this case, the first power ELVDD may be set to a level (e.g., a voltage level or a potential level) greater than that of the second power ELVSS. The light emitting element EE may include an organic light emitting element or a quantum dot light emitting element.

Each of the plurality of transistors T1 to T7 may include an input electrode (e.g., a source electrode), an output electrode (e.g., a drain electrode), and a control electrode (e.g., a gate electrode). For convenience, as used in this specification, one of the input electrode or the output electrode may be referred to as a first electrode and the other thereof may be referred to as a second electrode.

The first electrode of the first transistor T1 may be connected to a first power source ELVDD via the fifth transistor T5. The second electrode of the first transistor T1 may be connected to an anode electrode of the light emitting element EE via the sixth transistor T6. The first transistor T1 may be referred to as a driving transistor in this specification.

The first transistor T1 may control an amount of current flowing in the light emitting element EE according to a voltage applied to the control electrode of the first transistor T1.

The second transistor T2 may be connected between the data line DL and the first electrode of the first transistor T1. The control electrode of the second transistor T2 may be connected to the i-th scan line GLi. When an i-th scan signal is applied to the i-th scan line GLi, the second transistor T2 may be turned on to electrically connect the data line DL to the first electrode of the first transistor T1.

The third transistor T3 may be connected between the second electrode of the first transistor T1 and the control electrode of the first transistor T1. The control electrode of the third transistor T3 may be connected to the i-th scan line GLi. When the i-th scan signal is provided to the i-th scan line GLi, the third transistor T3 is turned on to electrically connect the second electrode of the first transistor T1 to the control electrode of the first transistor T1. Accordingly, when the third transistor T3 is turned on, the first transistor T1 is connected in the form of a diode (e.g., the first transistor T1 is diode-connected).

The fourth transistor T4 may be connected between a node ND and an initialization power generation unit (e.g., an initialization power supply). The control electrode of the fourth transistor T4 may be connected to an (i−1)-th scan line GLi−1. When an (i−1)-th scan signal is provided to the (i−1)-th scan line GLi−1, the fourth transistor T4 is turned on to provide an initialization voltage Vint to the node ND.

The fifth transistor T5 may be connected between the power line PL and the first electrode of the first transistor T1. The control electrode of the fifth transistor T5 may be connected to the i-th emission control line ECLi.

The sixth transistor T6 may be connected between the second electrode of the first transistor T1 and the anode electrode of the light emitting element EE. The control electrode of the sixth transistor T6 may be connected to the i-th emission control line ECLi.

The seventh transistor T7 may be connected between the initialization power generation unit and the anode electrode of the light emitting element EE. The control electrode of the seventh transistor T7 may be connected to an (i+1)-th scan line GLi+1. When the (i+1)-th scan signal is provided to the (i+1)-th scan line GLi+1, the seventh transistor T7 is turned on to provide the initialization voltage Vint to the anode electrode of the light emitting element EE.

The seventh transistor T7 may improve a black display capability of the pixel PX. For example, when the seventh transistor T7 is turned on, a parasitic capacitor of the light emitting element EE may be discharged. Thus, when a black luminance is implemented, the light emitting element EE may not emit light due to a leakage current from the first transistor T1, and thus, the black display performance may be improved.

While FIG. 4B shows that the control electrode of the seventh transistor T7 may be connected to the (i+1)-th scan line GLi+1, the present disclosure is not limited thereto. For example, in another embodiment of the present disclosure, the control electrode of the seventh transistor T7 may be connected to the i-th scan line GLi or the (i−1)-th scan line GLi−1.

The capacitor CP may be disposed between the power line PL and the node ND. The capacitor CP stores a voltage corresponding to the data signal. When the fifth transistor T5 and the sixth transistor T6 are turned on according to the voltage stored in the capacitor CP, an amount of current flowing through the first transistor T1 may be determined.

However, the present disclosure is not limited to the equivalent circuit diagram of the pixel PX shown in FIG. 4B. For example, according to another embodiment of the present disclosure, the pixel may have various suitable structures and/or shapes to enable the light emitting element EE to emit light. Although each of the transistors T1 to T7 is illustrated as a PMOS transistor in FIG. 4B, the present disclosure is not limited thereto. For example, in another embodiment of the present disclosure, each of the transistors T1 to T7 of the pixel circuit CC may be implemented as (e.g., may be constituted by) an NMOS transistor. In another example, in an embodiment of the present disclosure, the transistors T1 to T7 of the pixel circuit CC may be implemented as (e.g., may be constituted by) any suitable combinations of the NMOS transistors and the PMOS transistors.

Referring again to FIG. 4A, a power source pattern VDD may be disposed at (e.g., in or on) the peripheral area NDA. In this embodiment, the power source pattern VDD may be connected to the plurality of power lines PL. Accordingly, the display panel DP may include the power source pattern VDD to provide the same or substantially the same first power signal to the plurality of pixels PX.

The display pads PDD may include a first pad D1 and a second pad D2. The first pad D1 may be provided in a plurality, and the plurality of first pads D1 may be connected to the data lines DL, respectively. The second pad D2 may be connected to the power source pattern VDD, and may be electrically connected to the power line PL. The display panel DP may provide electrical signals that are externally provided (e.g., that are provided from the outside) to the pixels PX through the display pads PDD. The display pads PDD may further include pads for receiving other electrical signals, in addition to the first pad D1 and the second pad D2, but the present disclosure is not limited thereto.

Figure 5:
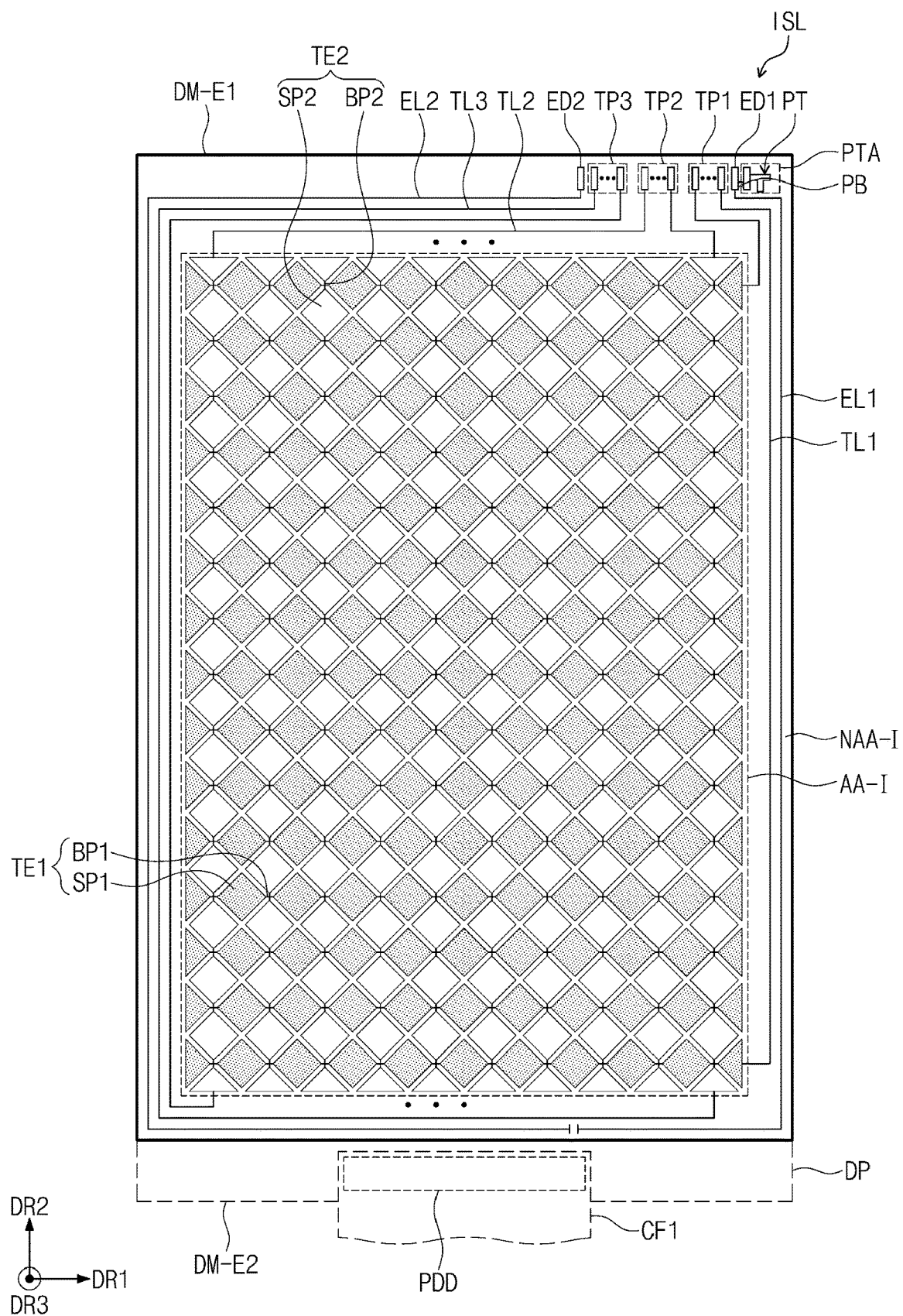
FIG. 5 is a plan view of an input sensing panel according to an embodiment of the present disclosure.
Figure 6A:
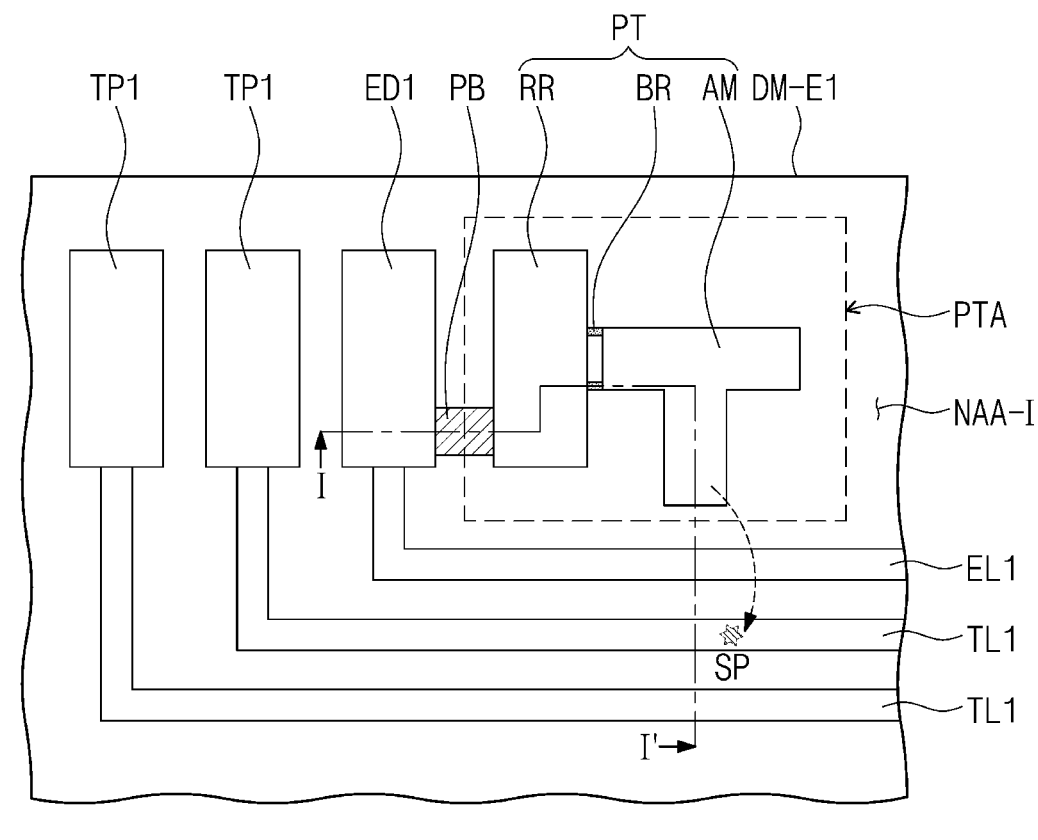
FIG. 6A is an enlarged view illustrating an area of the input sensing panel according to an embodiment of the present disclosure.
Figure 6B:
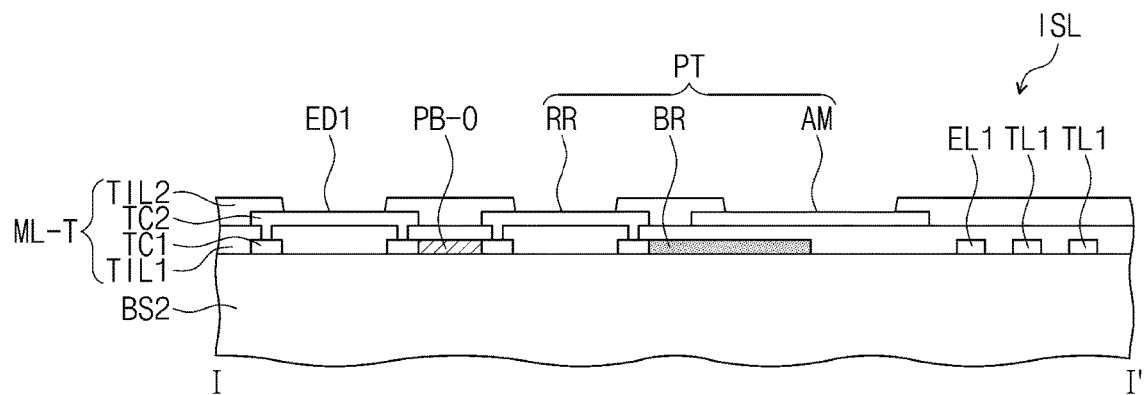
FIG. 6B is a cross-sectional view taken along the line I-I' of FIG. 6A.
Figure 6C:
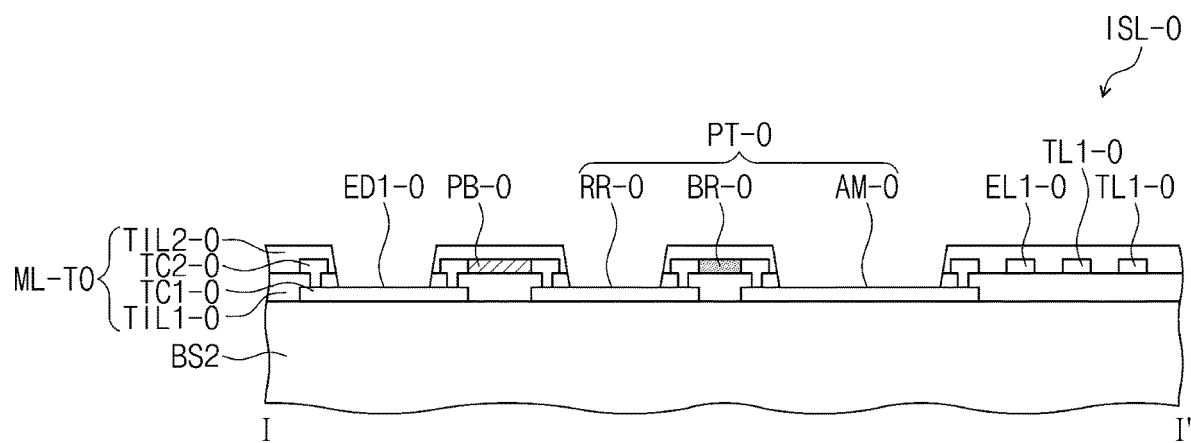
FIG. 6C is a cross-sectional view of the input sensing panel according to an embodiment of the present disclosure.

FIG. 5 is a plan view of the input sensing panel according to an embodiment of the present disclosure. FIG. 6A is an enlarged view illustrating one area of the input sensing panel according to an embodiment of the present disclosure. FIG. 6B is a cross-sectional view taken along line I-I' of FIG. 6A; FIG. 6C is a cross-sectional view of the input sensing panel according to an embodiment of the present disclosure.

Referring to FIG. 5, the input sensing panel ISL may include a floating pattern unit (e.g., a floating pattern circuit) PT including a second substrate BS2, a first sensing electrode TE1, a second sensing electrode TE2, a plurality of sensing lines TL1, TL2, and TL3, a plurality of sensing pads TP1, TP2, and TP3, electrostatic sensing units (e.g., electrostatic sensors or electrostatic sensing circuits) ED1, ED2, EL1, and EL2, and a bridge pattern PB. The first sensing electrode TE1, the second sensing electrode TE2, the plurality of sensing lines TL1, TL2, and TL3, and the plurality of sensing pads TP1, TP2, and TP3 according to this embodiment may be defined as an input sensing unit (e.g., an input sensing layer or an input sensing circuit). The input sensing unit may be included in (e.g., may constitute) the sensing circuit layer ML-T described with reference to FIG. 3A or FIG. 3B.

An active area AA-I and a peripheral area NAA-I may be defined on the second substrate BS2. The peripheral area NAA-I may at least partially surround (e.g., around a periphery of) the active area AA-I.

A first control sensing electrode TE1 and a second control sensing electrode TE2 may be disposed at (e.g., in or on) the active area AA-I. The input sensing panel ISL may obtain information corresponding to the external input through a change in capacitance between the first sensing electrode TE1 and the second sensing electrode TE2.

The first sensing electrodes TE1 may include first sensing patterns SP1 and first connection patterns BP1. The first sensing electrodes TE1 may extend in the first direction DR1, and may be arranged along the second direction DR2. The first sensing patterns SP1 may be arranged to be spaced apart from each other in the first direction DR1. At least one first connection pattern BP1 may be connected to two first sensing patterns SP1 that are adjacent to each other.

The second sensing electrodes TE2 may include second sensing patterns SP2 and second connection patterns BP2. The second sensing electrodes TE2 may extend in the second direction DR2, and may be arranged along the first direction DR1. The second sensing electrodes TE2 may be arranged to be spaced apart from each other in the second direction DR2. At least one second connection pattern BP2 may be connected to two second sensing patterns SP2 that are adjacent to each other.

The sensing lines TL1, TL2, and TL3 may be disposed at (e.g., in or on) the peripheral area NAA-I. The sensing lines TL1, TL2, and TL3 may include first sensing lines TL1, second sensing lines TL2, and third sensing lines TL3.

The first sensing lines TL1 may be connected to the first sensing electrodes TE1. The second sensing lines TL2 may be connected to one end of the second sensing electrodes TE2. The third sensing lines TL3 may be connected to another end of the second sensing electrodes TE2. The other end of the second sensing electrodes TE2 may be an end opposite to the one end of the second sensing electrodes TE2.

According to one or more embodiments of the present disclosure, the second sensing electrodes TE2 may be connected to the second sensing lines TL2 and the third sensing lines TL3. Thus, sensitivity of an area with respect to the second sensing electrodes TE2, which may have a length that is relatively longer than that of the first sensing electrodes TE1, may be maintained or substantially maintained (e.g., may be uniformly maintained). However, the present disclosure is not limited thereto. For example, in an embodiment, the third sensing line TL3 may be omitted, but the present disclosure is not limited thereto.

The sensing pads TP1, TP2, and TP3 may be disposed at (e.g., in or on) the peripheral area NAA-I. The sensing pads TP1, TP2, and TP3 may include a first sensing pad TP1, a second sensing pad TP2, and a third sensing pad TP3. The first sensing pad TP1 may be connected to the first sensing lines TL1, and may be electrically connected to the first sensing electrodes TE1. The second sensing pad TP2 may be connected to the second sensing lines TL2, and the third sensing pad TP3 may be connected to the third sensing lines TL3. Therefore, the second sensing pad TP2 and the third sensing pad TP3 may be electrically connected to the second sensing electrodes TE2.

In this embodiment, the sensing pads TP1, TP2, and TP3 and the display pads PDD of the display panel DP may be disposed at (e.g., in or on) different sides of the display module DM (e.g., see FIG. 2) from each other. For example, the sensing pads TP1, TP2, and TP3 may be disposed to be spaced apart from the display pads PDD in the second direction DR2 with the active area AA-I therebetween. Accordingly, the sensing pads TP1, TP2, and TP3 may be disposed at (e.g., in or on) one side of the display module DM adjacent to the first edge DM-E1 of the display module DM, and the display pads PDD may be disposed at (e.g., in or on) another side of the display module DM adjacent to the second edge DM-E2 of the display module DM, the second edge DM-E2 being spaced apart from the first edge DM-E1 in the second direction DR2. For convenience, the display panel DP, the first circuit board CF1, and the display pads PDD are illustrated as dotted lines in FIG. 5.

The electrostatic sensing units ED1, ED2, EL1, and EL2 may be disposed at (e.g., in or on) the peripheral area NAA-I. The electrostatic sensing units ED1, ED2, EL1, and EL2 may include a first electrostatic sensing pad ED1, a second electrostatic sensing pad ED2, a first electrostatic sensing line EL1, and a second electrostatic sensing line EL2.

The first electrostatic sensing pad ED1 and the second electrostatic sensing pad ED2 may be spaced apart from each other with the sensing pads TP1, TP2, and TP3 interposed therebetween. For example, the first electrostatic sensing pad ED1 may be disposed between the first sensing pad TP1 and the floating pattern unit PT, and the second electrostatic sensing pad ED2 may be disposed to be spaced apart from the third sensing pad TP3. One end of the first electrostatic sensing line EU may be connected to the first electrostatic sensing pad ED1, and one end of the second electrostatic sensing line EL2 may be connected to the second electrostatic sensing pad ED2.

In an embodiment, the first electrostatic sensing line EL1 and the second electrostatic sensing line EL2 may surround (e.g., around a periphery of) the sensing electrodes TE1 and TE2. For example, the first electrostatic sensing line EL1 may surround (e.g., around a periphery of) a right side of each of the sensing electrodes TE1 and TE2 (e.g., a right side of the active area AA-I), and the second electrostatic sensing line EL2 may surround (e.g., around a periphery of) a left side of each of the sensing electrodes TE1 and TE2 (e.g., a left side of the active area AA-I). The other ends of the first electrostatic sensing line EU and the second electrostatic sensing line EL2 may be spaced apart from each other. Therefore, the first electrostatic sensing line EL1 and the second electrostatic sensing line EL2 may be electrically insulated from each other.

According to one or more embodiments of the present disclosure, the electrostatic sensing unit ED1, ED2, EL1, and EL2 surrounding (e.g., around a periphery of) the sensing electrodes TE1 and TE2 may be provided to determine (e.g., to easily determine) whether the input sensing unit is damaged by static electricity flowing from the outside to the input sensing unit.

The floating pattern unit PT may include a bridge pattern PB, and a plurality of patterns RR, BR, and AM that will be described in more detail below. The floating pattern unit PT may be electrically insulated from the input sensing unit, for example, the floating patterns. In FIG. 6A, an example in which the floating pattern unit PT is disposed at an edge of the input sensing panel ISL and adjacent to the first electrostatic sensing pad ED1 is illustrated.

The floating pattern unit PT may be disposed within a floating area PTA. In the process of forming the input sensing panel ISL, the floating area PTA may be an area that is electrically insulated from the input sensing unit, and on which the patterns RR, BR, and AM that may be desired for a process convenience are disposed.

The patterns RR, BR, and AM included in the floating pattern unit PT may be electrically connected to each other, and thus, each of the sensing pads TP1, TP2, and TP3 and the electrostatic pads ED1 and ED2 may have a relatively large area.

The floating pattern unit PT may be electrically connected to a component (e.g., one component) of the electrostatic sensing units ED1, ED2, EL1, and EL2 by the bridge pattern PB. For example, as shown in FIG. 5, the floating pattern unit PT and the first electrostatic sensing pad ED1 may be connected to each other by the bridge pattern PB.

Referring to FIG. 6A, in an embodiment, the floating pattern part PT may include a resistance test pattern RR, an alignment pattern AM, and a connection pattern BR. The resistance test pattern RR, the alignment pattern AM, and the connection pattern BR may be electrically insulated from the input sensing unit.

The alignment pattern AM may be used to align the pads (not shown) and the sensing pads TP1, TP2, and TP3, which are disposed on the second circuit board CF2 (e.g., see FIG. 2), or may be used to recognize positions of the pads when a signal is applied to the electrostatic sensing units ED1, ED2, EL1, and EL2 or to the resistance test pattern RR. Although one alignment pattern AM having a 'T' shape is illustrated in FIG. 6A, the present disclosure is not limited thereto. For example, the alignment pattern AM may be provided in a plurality, and/or may have various suitable shapes, but the present disclosure is not limited thereto.

The resistance test pattern RR may be disposed to be adjacent to the first electrostatic test pad ED1. The resistance test pattern RR may include (e.g., may be) a pad that is used to determine whether the second circuit board CF2 (e.g., see FIG. 2) is bonded to the sensing pads TP1, TP2, and TP3. Although one resistance test pattern RR is illustrated in FIG. 6A, the present disclosure is not limited thereto, and the resistance test pattern RR may be provided in a plurality.

The connection pattern BR may connect the resistance test pattern RR to the alignment pattern AM. For convenience, the connection pattern BR is described as a separate constituent (e.g., a separate component), but the patterns constituting the floating pattern unit PT may be formed through the same or substantially the same process. Accordingly, the patterns may include the same or substantially the same material as each other, and may be disposed on the same insulation layer.

The floating pattern unit PT may be disposed to be adjacent to the outermost side of the input sensing panel ISL, and may have a larger area than that of each of the relatively adjacent pads TP1, TP2, TP3, ED1, and ED2, so that the static electricity flowing from the outside may be charged (e.g., may be easily charged) in the floating pattern unit PT. The static electricity charged in the floating pattern unit PT may flow into the adjacent sensing lines TL1, TL2, and TL3, and/or may flow into one constituent (e.g., one component) of the input sensing unit, which may cause a defect of the input sensing panel ISL.

In FIG. 6A, an example in which the static electricity charged in the alignment pattern AM of the floating pattern unit PT flows into the first sensing line TL1 to cause a defect SP is illustrated as a dotted line arrow.

According to one or more embodiments of the present disclosure, the floating pattern unit PT may be connected to the electrostatic sensing units ED1, ED2, EL1, and EL2 that are electrically insulated from the input sensing unit to provide a path through which the static electricity charged in the floating pattern unit PT may be introduced into the electrostatic sensing units ED1, ED2, EL1, and EL2. Accordingly, a path through which the static electricity charged in the floating pattern unit PT is introduced into the input sensing unit may be blocked or substantially blocked to reduce the defect of the input sensing panel ISL that may be caused due to the static electricity. Therefore, the display device having improved reliability may be provided.

Referring to FIG. 6B, the sensing circuit layer ML-T of the input sensing panel ISL according to an embodiment of the present disclosure may include a first insulation layer TIL1, a second insulation layer TIL2, a first conductive layer TC1, and a second conductive layer TC2. Although an example of a constituent (e.g., the components) corresponding to the sensing circuit layer ML-T that is disposed on the second substrate BS2 of FIG. 3A is illustrated in FIGS. 6B and 6C, the present disclosure is not limited thereto. For example, the constituent (e.g., the components) corresponding to the sensing circuit layer ML-T of FIGS. 6B and 6C may be equally or substantially equally applied to the sensing circuit layer ML-T of FIG. 3B. In this case, the constituent (e.g., the components) corresponding to the sensing circuit layer ML-T shown in FIGS. 6B and 6C may be disposed on a base layer (e.g., a thin film encapsulation layer) ECL as shown in FIG. 3B, instead of on the second substrate BS2 shown in FIGS. 6B and 6C.

The first conductive layer TC1 is disposed on the second substrate BS2. In an embodiment, the first conductive layer TC1 may include a metal material. For example, the first conductive layer TC1 may include molybdenum, silver, titanium, copper, aluminum, or a combination (e.g., an alloy) thereof. In an embodiment, the alloy may be, for example, molybdenum niobium.

As the first conductive layer TC1 includes a metal, the first conductive layer TC1 may be defined as the first connection patterns BP1, the sensing lines TL1, a portion of the electrostatic sensing pads ED1 and ED2, the electrostatic sensing lines EL1 and EL2, and a portion of the floating pattern unit PT, for example, portions of the bridge pattern PB, the connection pattern BR, and the resistance test pattern RR, from among the constituents (e.g., the components) of the input sensing panel ISL shown in FIG. 5. In an embodiment, the connection pattern BR and the bridge pattern PB may be disposed at (e.g., in or on) the same layer as each other.

FIG. 6B illustrates an example cross-sectional view taken along the line I-I' of FIG. 6A, in which the first sensing line TL1 from among the sensing lines TL1, TL2, and TL3, the first electrostatic sensing pad ED1 from among the electrostatic sensing pads ED1 and ED2, and the first electrostatic sensing line EL1 from among the electrostatic sensing lines EL1 and EL2 are shown.

The first insulation layer TIL1 may cover the first conductive layer TC1. The first insulation layer TIL1 may include an inorganic material, for example, including at least one of silicon nitride, silicon oxide nitride, silicon oxide, titanium oxide, and aluminum oxide.

The second conductive layer TC2 may be disposed on the first insulation layer TIL1. In an embodiment, the second conductive layer TC2 may include a transparent conductive material. As used in this specification, transparent may refer to a light transmittance that is greater than or equal to a reference (e.g., a predetermined reference). For example, the reference may be about 90%, but the present disclosure is not limited thereto. The second conductive layer TC2 may include a transparent conductive oxide, for example, including at least one of indium tin oxide (ITO), indium zinc oxide (IZO), indium gallium oxide (IGO), and indium zinc gallium Oxide (IGZO), or a mixture/compound thereof. However, the present disclosure is not limited thereto.

As the second conductive layer TC2 includes the transparent conductive material, the second conductive layer TC2 may be defined as the sensing patterns SP1 and SP2, the second connection patterns BP2, the remaining portion of the electrostatic sensing pads ED1 and ED2, and the remaining portion of the floating pattern unit PT, for example, the remaining portion of the resistance test pattern RR, from among the constituents (e.g., the components) of the input sensing panel ISL of FIG. 5.

In an embodiment, the first sensing pads SP1 and the first connection patterns BP1 may be connected to each other by contact holes extending through (e.g., passing through) the first insulation layer TIL1.

The second insulation layer TIL2 may cover the second conductive layer TC2. The second insulation layer TIL2 may include an inorganic material, for example, including at least one of silicon nitride, silicon oxide nitride, silicon oxide, titanium oxide, and aluminum oxide.

Referring to FIG. 6C, a sensing circuit layer ML-T0 of an input sensing panel ISL-0 according to an embodiment of the present disclosure may include a first insulation layer TIL1-0, a second insulation layer TIL2-0, a first conductive layer TC1-0, and a second conductive layer TC2-0. The first insulation layer TIL1-0 and the second insulation layer TIL2-0 may be the same or substantially the same as the first insulation layer TIL1 and the second insulation layer TIL2, which are described with reference to FIG. 6B.

In an embodiment, the first conductive layer TC1-0 may include a transparent conductive material, and the second conductive layer TC2-0 may include a metal.

As the first conductive layer TC1-0 includes the transparent conductive material, the first conductive layer TC1-0 may be defined as the sensing patterns SP1 and SP2, the second connection patterns BP2, a portion of electrostatic sensing pads ED1-0 and ED2-0, and a portion of a floating pattern unit (e.g., a floating pattern circuit) PT-0, for example, a portion of a resistance test pattern RR-0, from among the constituents (e.g., the components) of the input sensing panel ISL of FIG. 5.

As the second conductive layer TC2-0 includes the metal, the first conductive layer TC2-0 may be defined as the first connection patterns BP1, the sensing lines TL1-0, the remaining portion of the electrostatic sensing pads ED1-0 and ED2-0, the electrostatic sensing lines EL1-0 and EL2-0, and the remaining portion of the floating pattern unit PT-0, for example, remaining portions of a bridge pattern PB-0, a connection pattern BR-0, and the resistance test pattern RR-0, from among the constituents (e.g., the components) of the input sensing panel ISL of FIG. 5. In an embodiment, the connection pattern BR-0 and the bridge pattern PB-0 may be formed at (e.g., in or on) the same layer as each other.

In an embodiment, the first sensing pads SP1 and the first connection patterns BP1 may be connected to each other by contact holes extending through (e.g., passing through) the second insulation layer TIL2.

FIG. 6C illustrates an example cross-sectional view taken along the line I-I' of FIG. 6A, in which the first sensing line TL1-0 from among the sensing lines TL1-0, TL2, and TL3, the first electrostatic sensing pad ED1-0 from among the electrostatic sensing pads ED1-0 and ED2, and the first electrostatic sensing line EL1-0 from among the electrostatic sensing lines EL1-0 and EL2 are shown.

Figure 7:
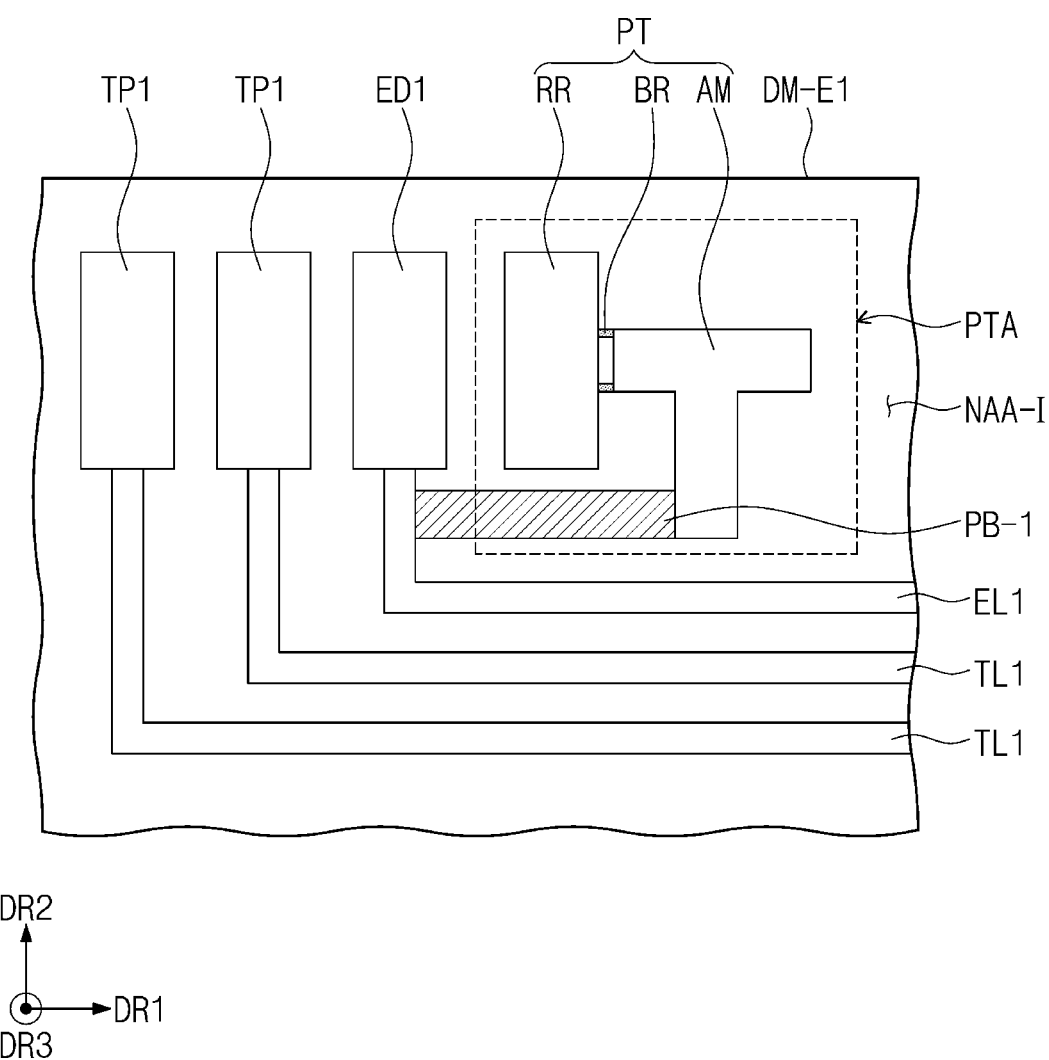
FIG. 7 is an enlarged view illustrating an area of the input sensing panel according to an embodiment of the present disclosure.
Figure 8:
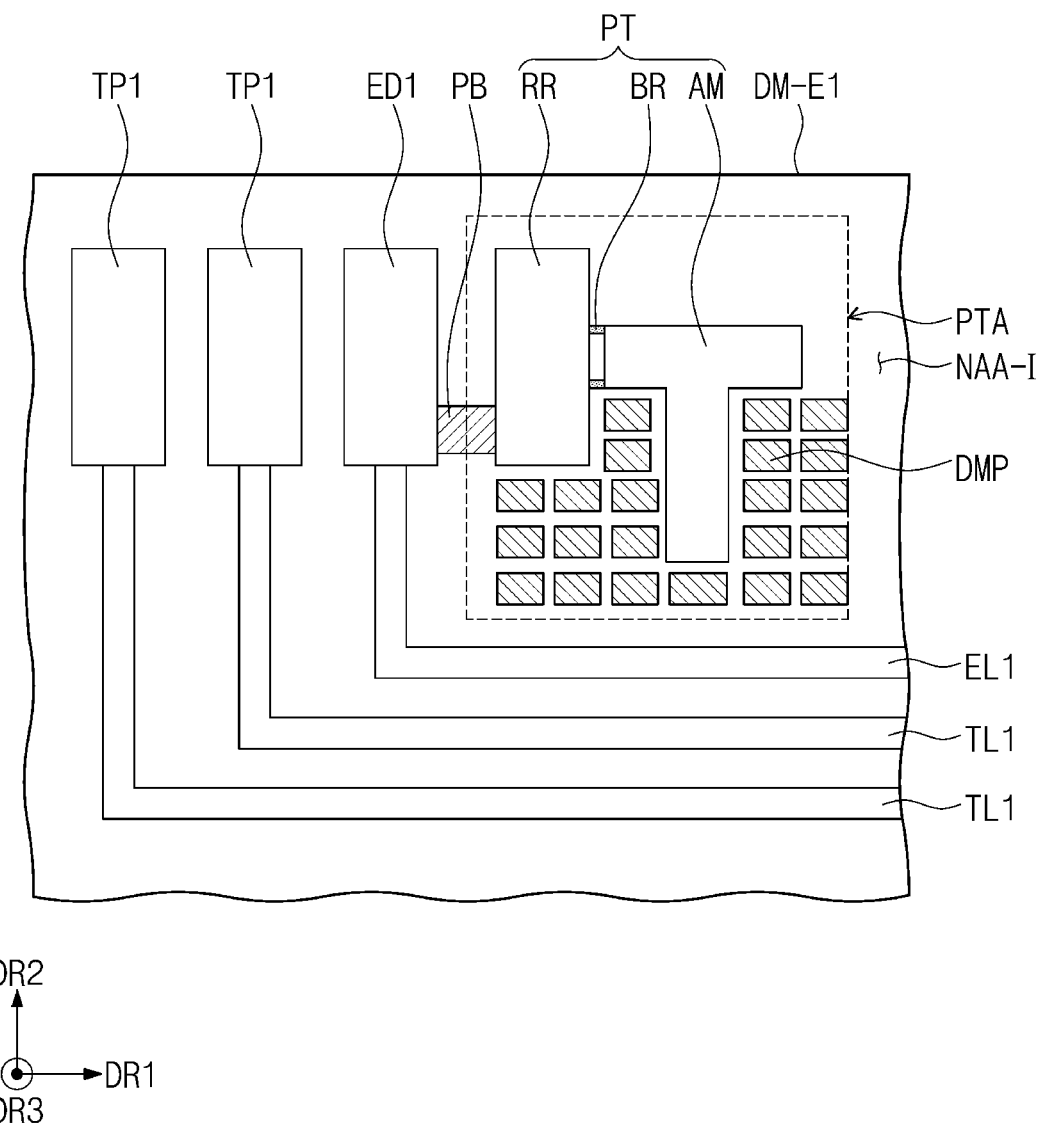
FIG. 8 is an enlarged view illustrating an area of the input sensing panel according to an embodiment of the present disclosure.

FIG. 7 is an enlarged view illustrating an area of the input sensing panel according to an embodiment of the present disclosure. FIG. 8 is an enlarged view illustrating an area of the input sensing panel according to an embodiment of the present disclosure. The same/similar reference symbols are used for the same or substantially the same (or similar) components as those of FIGS. 1 to 6C, and thus, redundant description thereof may be simplified or may not be repeated.

Referring to FIG. 7, the bridge pattern PB-1 according to an embodiment may be connected to the alignment pattern AM and the first electrostatic sensing line EL1.

According to an embodiment, the bridge pattern PB-1 may be connected to a portion of the alignment pattern AM that is closest to the first sensing line TL1. For example, the bridge pattern PB-1 may be connected to a protruding portion of the alignment pattern AM that extends towards (e.g., that faces) the first sensing line TL1, and may be disposed on the first electrostatic sensing line EL1 to prevent or substantially prevent (e.g., to effectively prevent) the static electricity introduced from the outside from being introduced into the first sensing line TL1. However, the present disclosure is not limited thereto. For example, when the bridge pattern PB-1 is connected to an area of the alignment pattern AM, which protrudes to be adjacent to the input sensing unit, and is connected to the second electrostatic sensing line EL2 to provide a path through which the static electricity introduced from the outside flows through the electrostatic sensing units ED1, ED2, EL1, and EL2, the connection position and/or shape of the bridge pattern PB-1 may not be limited to a specific embodiment.

Referring to FIG. 8, according to an embodiment, the input sensing panel ISL may further include a dummy pattern DMP disposed between the floating pattern unit PT and the electrostatic sensing units ED1 and EU, and electrically insulated from the input sensing unit. The dummy patterns DMP may be provided in a plurality, and may be spaced apart from each other in the first and second directions DR1 and DR2.

The dummy pattern DMP may be disposed at (e.g., in or on) the same layer as that of the bridge pattern PB. The dummy pattern DMP may include a metal.

As the input sensing panel ISL includes the dummy pattern DMP, the dummy pattern DMP may be disposed between the floating pattern unit PT and the electrostatic sensing units ED1 and EL1, so that the static electricity charged in the floating pattern unit PT may be introduced into the dummy pattern DMP, thereby providing a display device having improved reliability.

Figure 9A:
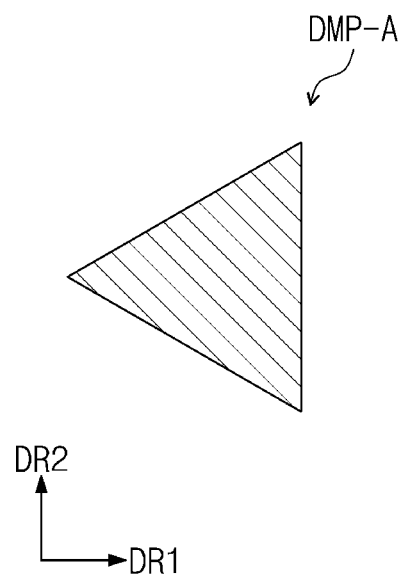
FIGS. 9A-9C are plan views of a dummy pattern according to one or more embodiments of the present disclosure.
Figure 9B:
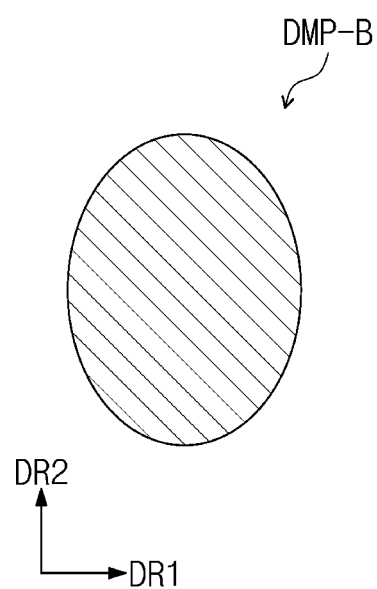
Figure 9C:
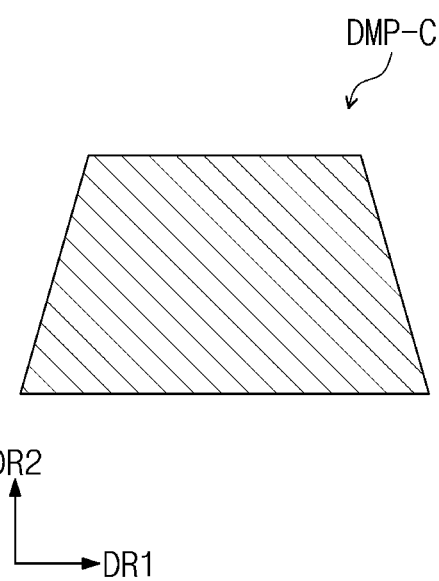

FIGS. 9A to 9C are plan views of a dummy pattern according to one or more embodiments of the present disclosure. The same/similar reference symbols are used to denote the same or substantially the same (or similar) components and/or configurations as those of FIGS. 1 to 6C and 8, and thus, redundant description thereof may be simplified or may not be repeated.

Referring to FIGS. 9A to 9C, in an embodiment, a dummy pattern DMP-A may be provided in a triangular shape. In an embodiment, a dummy pattern DMP-B may be provided in an oval shape. In an embodiment, a dummy pattern DMP-C may be provided in a trapezoidal shape. However, the present disclosure is not limited thereto. For example, the dummy pattern may be provided in a polygonal shape and/or a circular shape, may be provided in a plurality, and/or may have different shapes so that the dummy patterns are provided in different shapes from each other, but the present disclosure is not limited thereto.

Referring to FIGS. 2 and 5, although the circuit boards CF1 and CF2 according to one or more embodiments of the present disclosure are described as being disposed on different edges DM-E1 and DM-E2 of the display module DM from each other, the present disclosure is not limited thereto. For example, the circuit boards CF1 and CF2 may be disposed on edges of the display module DM that are adjacent to each other, but the present disclosure is not limited thereto.

According to one or more example embodiments of the present disclosure, the floating pattern unit may be connected to the electrostatic sensing unit that is electrically insulated from the input sensing unit to provide a path through which static electricity charged in the floating pattern unit may flow into the electrostatic sensing unit. Accordingly, a path through which the static electricity charged in the floating pattern unit that may be introduced into the input sensing unit may be blocked or substantially blocked to prevent or reduce a defect of the input sensing panel due to the static electricity. Therefore, the display device having improved reliability may be provided.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A display device comprising:
a display panel comprising a plurality of pixels, and display pads connected to the pixels; and
an input sensing panel on the display panel, and comprising:
an input sensing layer comprising:
a sensing electrode configured to sense an input;
a sensing line connected to the sensing electrode; and
sensing pads connected to the sensing line;
an electrostatic sensing circuit spaced from the sensing pads; and
a floating pattern circuit electrically insulated from the input sensing layer, and comprising a bridge pattern,
wherein the bridge pattern is connected to the electrostatic sensing circuit.

2. The display device of claim 1, wherein the floating pattern circuit comprises a resistance test pattern, and an alignment pattern connected to the resistance test pattern.

3. The display device of claim 2, wherein the electrostatic sensing circuit comprises:
a first electrostatic sensing pad, and a second electrostatic sensing pad spaced from the first electrostatic sensing pad with the sensing pads therebetween;
a first electrostatic sensing line surrounding a portion of the sensing electrode, and comprising one end connected to the first electrostatic sensing pad; and
a second electrostatic sensing line surrounding another portion of the sensing electrode, and comprising one end connected to the second electrostatic sensing pad,
wherein other ends of the first electrostatic sensing line and the second electrostatic sensing line are spaced from each other.

4. The display device of claim 3, wherein the bridge pattern connects one of the first electrostatic sensing pad and the second electrostatic sensing pad to the resistance test pattern.

5. The display device of claim 3, wherein the bridge pattern connects one of the first electrostatic sensing line and the second electrostatic sensing line to the alignment pattern.

6. The display device of claim 1, wherein the input sensing panel further comprises a dummy pattern between the electrostatic sensing circuit and the floating pattern circuit.

7. The display device of claim 6, wherein the dummy pattern has one from among a polygonal shape, an oval shape, and a circular shape.

8. The display device of claim 1, wherein the input sensing panel comprises:
a first conductive layer on the display panel;
a first insulation layer covering the first conductive layer; and
a second conductive layer on the first insulation layer.

9. The display device of claim 8, wherein the first conductive layer comprises a metal,
the second conductive layer comprises a transparent conductive material, and
the bridge pattern is defined as a portion of the first conductive layer.

10. The display device of claim 8, wherein the second conductive layer comprises a metal,
the first conductive layer comprises a transparent conductive material, and
the bridge pattern is defined as a portion of the second conductive layer.

11. The display device of claim 1, further comprising:
an active area defined in a first direction and a second direction crossing the first direction, the active area being configured to provide light generated from the display panel; and
a peripheral area surrounding the active area,
wherein the display pads are arranged along the first direction at one side of the peripheral area, and
wherein the sensing pads and the floating pattern circuit are arranged along the first direction at another side of the peripheral area to be spaced from the display pads in the second direction with the active area therebetween.

12. The display device of claim 1, further comprising a coupling member,
wherein the display panel and the input sensing panel are bonded to each other through the coupling member.

13. The display device of claim 1, wherein the input sensing panel is directly disposed on the display panel.

14. A display device comprising:
a base layer;
an input sensing layer on the base layer, and comprising:
a sensing electrode configured to sense an input;
a sensing line connected to the sensing electrode; and
sensing pads connected to the sensing line;
an electrostatic sensing circuit spaced from the sensing pads; and
a floating pattern circuit electrically insulated from the input sensing layer, and comprising a bridge pattern,
wherein the bridge pattern is connected to the electrostatic sensing circuit.

15. The display device of claim 14, wherein the floating pattern circuit comprises a resistance test pattern, and an alignment pattern connected to the resistance test pattern.

16. The display device of claim 15, wherein the electrostatic sensing circuit comprises:
a first electrostatic sensing pad, and a second electrostatic sensing pad spaced from the first electrostatic sensing pad with the sensing pads therebetween;
a first electrostatic sensing line surrounding a portion of the sensing electrode, and comprising one end connected to the first electrostatic sensing pad; and
a second electrostatic sensing line surrounding another portion of the sensing electrode, and comprising one end connected to the second electrostatic sensing pad,
wherein other ends of the first electrostatic sensing line and the second electrostatic sensing line are spaced from each other.

17. The display device of claim 16, wherein the bridge pattern connects one of the first electrostatic sensing pad and the second electrostatic sensing pad to the resistance test pattern.

18. The display device of claim 16, wherein the bridge pattern connects one of the first electrostatic sensing line and the second electrostatic sensing line to the alignment pattern.

19. The display device of claim 14, wherein the input sensing layer further comprises a dummy pattern between the electrostatic sensing circuit and the floating pattern circuit.

20. The display device of claim 19, wherein each of the bridge pattern and the dummy pattern comprises a metal.

* * * * *